(12) United States Patent
Li et al.

(10) Patent No.: US 9,386,545 B2
(45) Date of Patent: Jul. 5, 2016

(54) POWER CONTROL OF PHYSICAL UPLINK CONTROL CHANNEL FOR LONG TERM EVOLUTION -ADVANCED TIME DIVISION DUPLEX

(75) Inventors: Shupeng Li, Iselin, NJ (US); David Huo, Iselin, NJ (US)

(73) Assignee: ZTE (USA) Inc., Austin, TX (US)

( * ) Notice: Subject to any disclaimer, the term of this patent is extended or adjusted under 35 U.S.C. 154(b) by 200 days.

(21) Appl. No.: 14/116,635

(22) PCT Filed: May 9, 2012

(86) PCT No.: PCT/US2012/036986
§ 371 (c)(1),
(2), (4) Date: Aug. 12, 2014

(87) PCT Pub. No.: WO2012/154765
PCT Pub. Date: Nov. 15, 2012

(65) Prior Publication Data
US 2014/0348036 A1    Nov. 27, 2014

Related U.S. Application Data

(60) Provisional application No. 61/485,431, filed on May 12, 2011, provisional application No. 61/484,035, filed on May 9, 2011.

(51) Int. Cl.
*H04W 52/32* (2009.01)
*H04W 52/48* (2009.01)
*H04L 5/14* (2006.01)

(52) U.S. Cl.
CPC ........... *H04W 52/325* (2013.01); *H04L 5/1469* (2013.01); *H04W 52/48* (2013.01)

(58) Field of Classification Search
CPC .. H04W 52/48; H04W 52/325; H04L 5/1469; A61K 39/00; C07K 14/195; C12Q 1/689; Y10S 977/924

USPC ................ 370/280, 329, 328, 252; 455/422.1
See application file for complete search history.

(56) References Cited

U.S. PATENT DOCUMENTS

2009/0257408 A1* 10/2009 Zhang ................... H04L 1/1621
370/336
2010/0210256 A1* 8/2010 Shen ..................... H04L 1/1614
455/422.1

(Continued)

OTHER PUBLICATIONS

3GPP TS 36.213 V10.0.0 (Dec. 2010).*
3GPP_Specs_TS36P213_1000; 3rd Generation Partnership Project; Technical Specification Group Radio Access Network; Evolved Universal Terrestrial Radio Access (E-UTRA); Physical layer procedures (Release 10).*

(Continued)

*Primary Examiner* — Andrew Lai
*Assistant Examiner* — Mahmudul Hasan
(74) *Attorney, Agent, or Firm* — Drinker Biddle & Reath LLP

(57) ABSTRACT

Methods and apparatus are directed towards controlling power of physical uplink control channel (PUCCH) format 1b for advanced time division duplex. If HARQ-ACK bundling is not applied, then $n_{HARQ}$ associated with the PUCCH is determined based on a number of received transport blocks and SPS release physical downlink control channels in subframes $i-k_m$. If HARQ-ACK bundling is applied and a number of assigned resource blocks equal to 2, then $n_{HARQ}$ associated with the PUCCH is determined based on a number of received physical downlink shared channels (PDSCH) and semi-persistent scheduling (SPS) release physical downlink control channels (PDCCH) in the subframes $i-k_m$.

6 Claims, 3 Drawing Sheets

(56) References Cited

U.S. PATENT DOCUMENTS

| | | | |
|---|---|---|---|
| 2010/0271970 A1* | 10/2010 | Pan et al. | 370/252 |
| 2011/0090825 A1* | 4/2011 | Papasakellariou | H04L 1/06 370/280 |
| 2011/0243066 A1* | 10/2011 | Nayeb Nazar | H04L 1/007 370/328 |
| 2012/0082157 A1* | 4/2012 | Yamada | H04L 1/0073 370/389 |
| 2012/0087254 A1* | 4/2012 | Yin | H04L 1/0031 370/252 |
| 2012/0113831 A1* | 5/2012 | Pelletier | H04L 5/0058 370/252 |
| 2012/0113907 A1* | 5/2012 | Baldemair et al. | 370/329 |
| 2013/0034073 A1* | 2/2013 | Aiba | H04L 1/0026 370/329 |
| 2013/0148592 A1* | 6/2013 | Noh | H04W 72/12 370/329 |

OTHER PUBLICATIONS

International Search Report for PCT/US2012/036986 mailed Jul. 30, 2012.

Zte, "R1-111506, Power control of PUCCH for LTE-A TDD", 3GPP Draft, May 3, 2011, vol. RAN WG1, Barcelona, Spain, XP050491183.

Catt, "R1-111361, Remaining issue on PUCCH power control in LTE-A", 3GPP Draft May 3, 2011, vol. RAN WG1, Barcelona, Spain, XP050491079.

Zte, "R1-100530, Code Book Design of Explicit Feedback", 3GPP Draft, Jan. 12, 2010, vol. RAN WG1, Valencia, Spain, XP050418158.

Zte, "R1-093197, Performance Sensitivity to Feedback Types", 3GPP Draft, Aug. 19, 2009, Shenzhen, China, XP050351550.

* cited by examiner

POWER CONTROL OF PHYSICAL UPLINK CONTROL CHANNEL FOR LONG TERM EVOLUTION -ADVANCED TIME DIVISION DUPLEX

FIELD OF THE INVENTION

The field of the present invention is wireless communication, and, in particular, power control of a physical uplink control channel for long term evolution.

BACKGROUND

In a discussion followed by Radio Access Network ("RAN") 1 #63bis meeting, power control for Physical Uplink Control Channel ("PUCCH") format 3 and PUCCH format 1b with channel selection was discussed, which is described in R1-110028 Power control for PUCCH format 3 with SORTDEricsson, ST-Ericsson, R1-110045 Dual RM segmentation and format 3 power control CATT, R1-110556 Power control for PUCCH Format 3Motorola Mobility, Alcatel-Lucent, Alcatel-Lucent Shanghai Bell, Huawei, HiSilicon, Motorola Solutions, Nokia Siemens Networks, Nokia, Panasonic, Qualcomm, and R1-110575 WF on PUCCH Format 3 power control CATT, CATR, CMCC, Ericsson, ST-Ericsson.

SUMMARY OF THE INVENTION

Aspects of the present invention are directed towards controlling power of physical uplink control channel (PUCCH) format 1b for advanced time division duplex. The methods and apparatus include identifying if HARQ-ACK bundling is applied. If HARQ-ACK bundling is not applied, then $n_{HARQ}$ associated with the PUCCH is determined based on a number of received transport blocks and SPS release physical downlink control channels in subframes i-$k_m$. If HARQ-ACK bundling is applied and a number of assigned resource blocks equal to 2, then $n_{HARQ}$ associated with the PUCCH is determined based on a number of received physical downlink shared channels (PDSCH) and semi-persistent scheduling (SPS) release physical downlink control channels (PDCCH) in the subframes i-$k_m$.

DETAILED DESCRIPTION OF EMBODIMENTS

Figure 1:
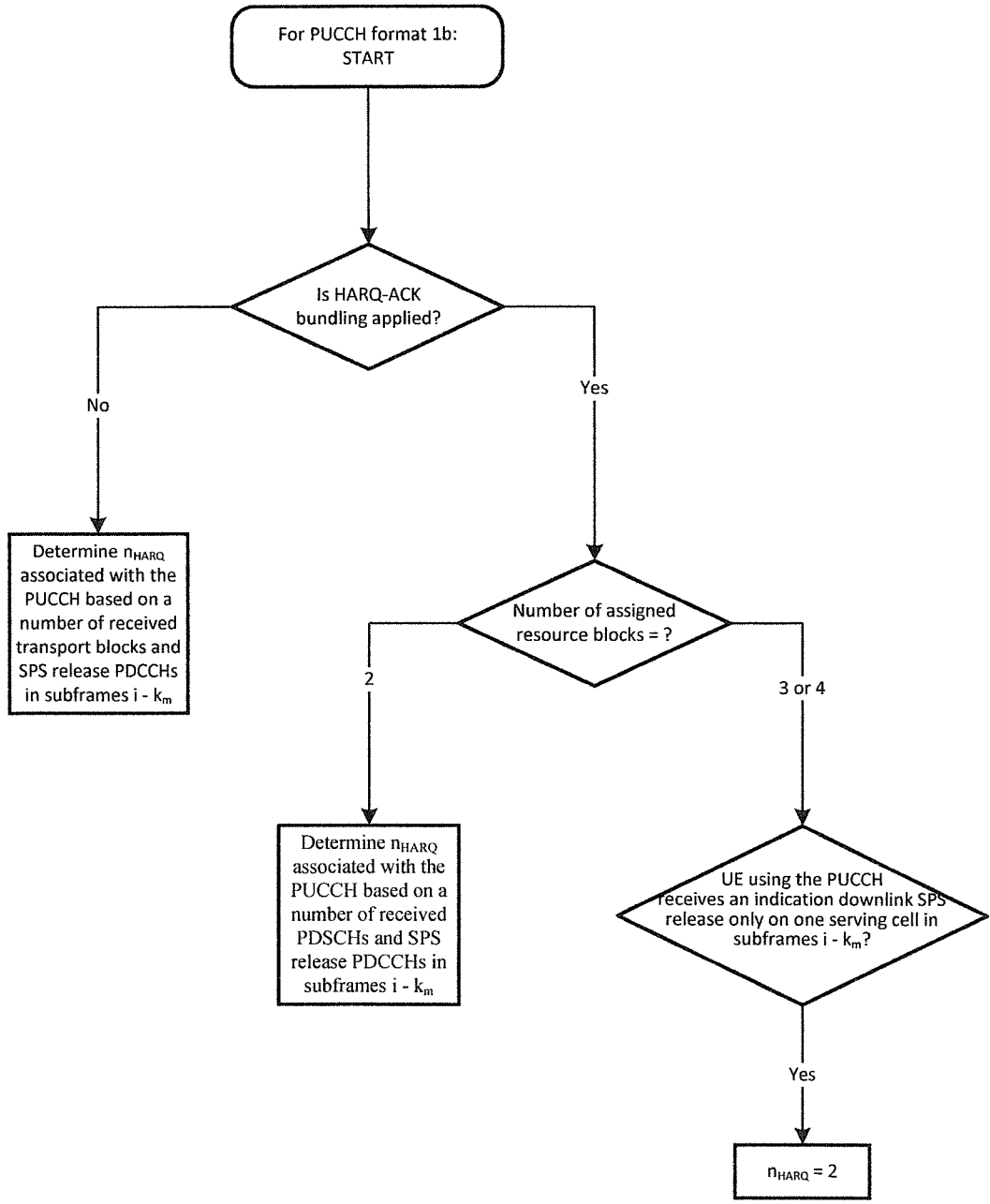
FIG. 1 is a flow diagram according to a disclosed embodiment with PUCCH format 1b.
Figure 2:
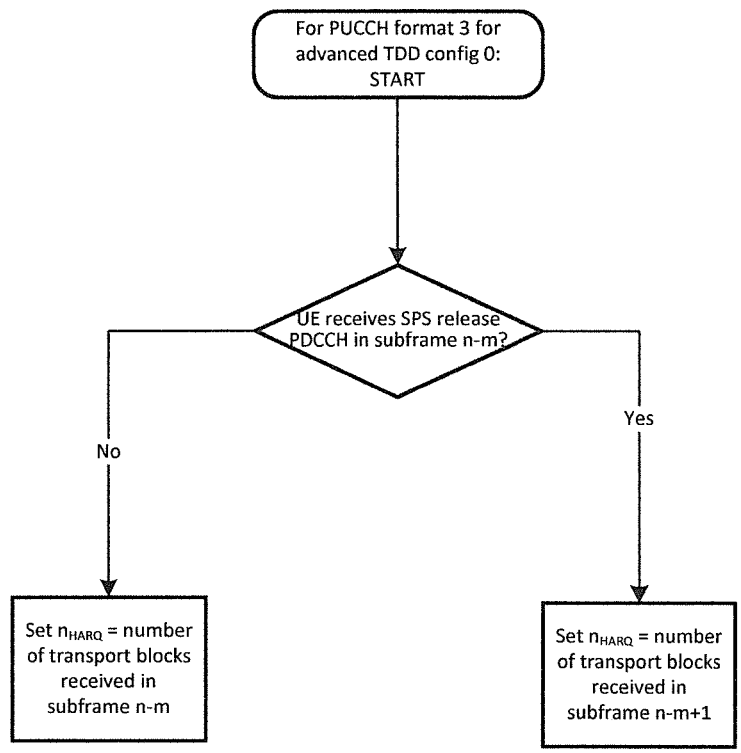
FIG. 2 is a flow diagram according to a disclosed embodiment with PUCCH format 3.
Figure 3:
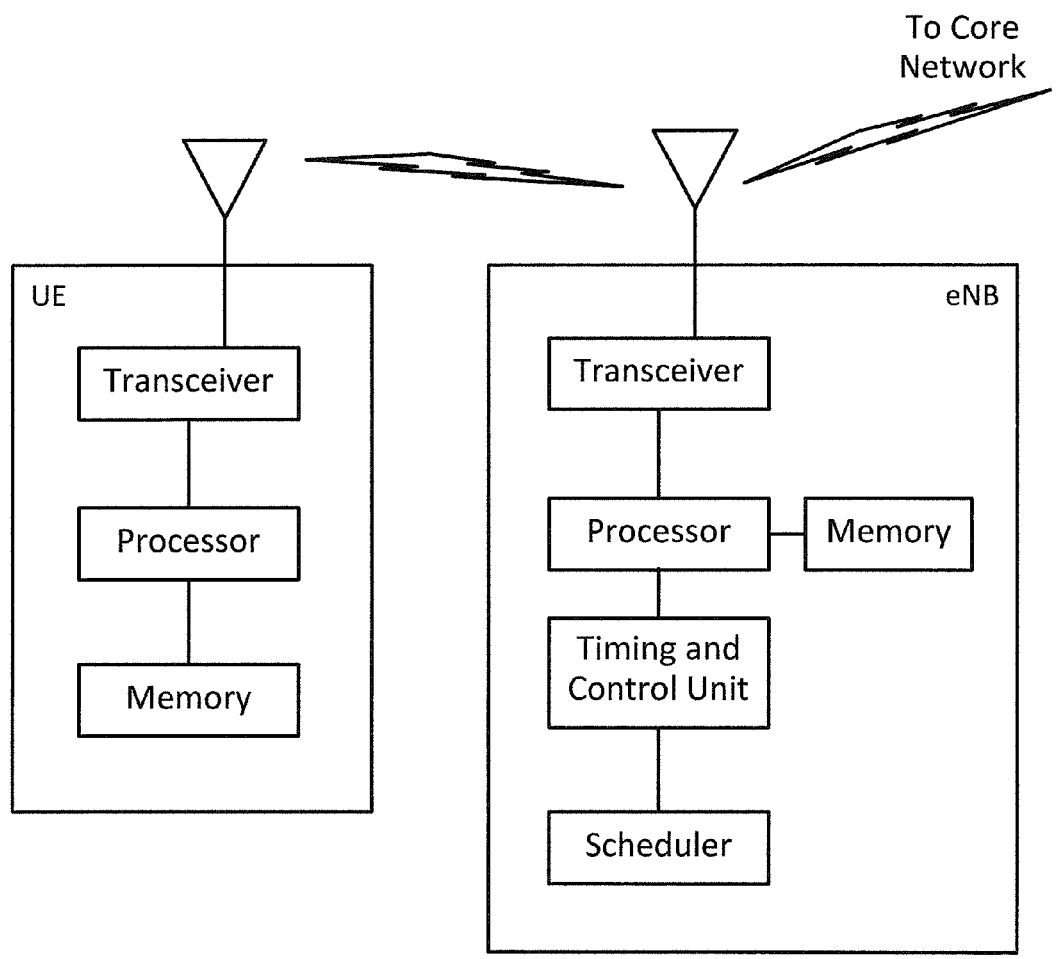
FIG. 3 is a diagram of a portion of an exemplary communication system in which the disclosed embodiments may be implemented.

For PUCCH format 1b with channel selection, if the User Equipment ("UE") is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})=0$, where "CQI"=channel quality information, "HARQ"=hybrid auto repeat request, and "SR"=scheduling request.

For PUCCH Format 3

For PUCCH format 3 single rate matching ("RM") coding without Spatial Orthogonal-Resource Transmit Diversity ("SORTD"), $$h(n_{CQI}, n_{HARQ}, n_{SR}) = \frac{n_{HARQ} + n_{SR} - 1}{2}.$$

For PUCCH format 3 single RM coding with SORTD, or PUCCH format 3 dual RM coding with/without SORTD, $$h(n_{CQI}, n_{HARQ}, n_{SR}) = \frac{n_{HARQ} + n_{SR} - 1}{3}.$$

The parameter $n_{HARQ}$ in $h(n_{CQI}, n_{HARQ}, n_{SR})$ for PUCCH format 1b with channel selection and PUCCH format 3 are based on the number of received transport blocks("TBs").

However, it can be noticed that the above definition of the parameter $n_{HARQ}$ is intended for Long Term Evolution—Advanced Frequency Division Duplex ("LTE-A FDD") and non-bundling case in LTE-A Long Term Evolution-Advanced Time Division Duplex ("LTE-A TDD"). It is expected some form of Acknowledgment/Non Acknowledgement ("ACK/NACK") bundling will be applied in LTE-A TDD, which may result in different power requirement for reliable ACK/NACK transmission. The current definition of $n_{HARQ}$ in $h(n_{CQI}, n_{HARQ}, n_{SR})$ is not always suitable and should be discussed further. In this contribution, we provide our views on the definition of $n_{HARQ}$ in LTE-A TDD.

$h(n_{CQI}, n_{HARQ}, n_{SR})$ for PUCCH Power Control in Release-10

According to the latest 36.213 specifications [5], if serving cell c is the primary cell, the setting of the UE Transmit power $P_{PUCCH}$ for the physical uplink control channel (PUCCH) transmission in subframe i is defined by $$P_{PUCCH}(i) = \min \begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases}$$

[dBm]

Where:
$h(n_{CQI}, n_{HARQ}, n_{SR})$ is a PUCCH format dependent value, where $n_{CQI}$ corresponds to the number of information bits for the channel quality information. $n_{SR}=1$ if subframe i is configured for SR for the UE, otherwise $n_{SR}=0$. If the UE is configured with one serving cell $n_{HARQ}$ is the number of HARQ bits sent in subframe i. In the case where HARQ-ACK bundling is not applied, if the UE is configured with more than one serving cell, and if the UE receives a SPS release PDCCH in one of the subframes i-$k_m$ where $k_m \in K$ and $0 \le m \le M-1$ then $n_{HARQ}=$(number of transport blocks received in subframes i-$k_m$)+1. If the UE does not receive a semi persistent scheduling ("SPS") release Physical Downlink Control Channel ("PDCCH") in one of the subframes i-$k_m$ then $n_{HARQ}=$(number of transport blocks received in subframes i-$k_m$). For FDD, M=1 and $k_0=4$. For TDD, values of M, K and $k_m$ are given in Table 10.1-1 shown in 3GPP TS 36.213 v10.0.0, Evolved Universal Terrestrial Radio Access (E-UTRA); Physical layer procedures.

For PUCCH format 1, 1a and 1b $h(n_{CQI}, n_{HARQ}, n_{SR})=0$:
For PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})=0$
For PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3
  If the UE is configured by higher layers to transmit PUCCH on two antenna ports, or if the UE transmits more than 11 bits of HARQ-ACK $$h(n_{CQI}, n_{HARQ}, n_{SR}) = \frac{n_{HARQ} + n_{SR} - 1}{3}$$

Otherwise $$h(n_{CQI}, n_{HARQ}, n_{SR}) = \frac{n_{HARQ} + n_{SR} - 1}{2}$$

The above definition of $n_{HARQ}$ in $h(n_{CQI}, n_{HARQ}, n_{SR})$ is not expected to be applied to LTE-A TDD bundling case. In addition, nothing is mentioned for PUCCH format 3 with dual-RM coding, which is specifically for large ACK/NACK payload feedback in LTE-A TDD.

The Definition of Parameter $n_{HARQ}$ in LTE-A TDD

For LTE-A TDD, it has been agreed that ACK/NACK bundling can be applied when the number of downlink ("DL") transmit blocks associated with a single uplink ("UL") subframe is too large to use either PUCCH format 1b with channel selection or PUCCH format 3. Accordingly the required PUCCH transmit power can be reduced along with the reduced ACK/NACK payload size, rather than to be determined based on the number of received TBs.

For PUCCH format 1b with channel selection:
  When UE is configured with more than one serving cell, time domain bundling is applied for ACK/NACK feedback. Because ACK/NACK can be bundled to 2 bits for each serving cell, the parameter $n_{HARQ}$ in $h(n_{CQI}, n_{HARQ}, n_{SR})$ can be equal to 2 or 4.
    if the UE receives a SPS release PDCCH in one of the subframes $i-k_m$, UE doesn't receive a physical downlink shared channel ("PDSCH") of secondary component carrier ("SCC"), or if the UE doesn't receive a SPS release PDCCH in one of the subframes $i-k_m$, UE only receives PDSCH of one serving cell The parameter $n_{HARQ}$ in $h(n_{CQI}, n_{HARQ}, n_{SR})$ can be equal to 2.
    UE receives PDSCH of SCC and a SPS release PDCCH in one of the subframes $i-k_m$, or UE receives PDSCH of two serving cell
      The parameter $n_{HARQ}$ in $h(n_{CQI}, n_{HARQ}, n_{SR})$ can be equal to 4.
Alternatively, if a Downlink Assignment Index ("DAI") is employed in determining the $n_{HARQ}$, it could be defined as follows:
  For TDD with two configured serving cells, PUCCH format 1b with channel selection and HARQ-ACK bundling, $$n_{HARQ} = \sum_{c=0}^{1} \min(N_{SPS} + V_{DAI,c}^{DL}, 2),$$

where c is the number of configured cells, $V_{DAI,c}^{DL}$ is the $V_{DAI}^{DL}$ in serving cell c.
For PUCCH format 3:
  In case of spatial HARQ-ACK bundling is not applied:
    $n_{HARQ}$ should be based on the number of received transport blocks and the number of received SPS release PDCCH in subframes $i-k_m$.
  In case of spatial HARQ-ACK bundling is applied:
    $n_{HARQ}$ should be based on the number of received PDSCH and the number of received SPS release PDCCH in subframes $i-k_m$.
Alternatively, if DAI is employed in determining the $n_{HARQ}$, it could be defined as follows:
  For TDD UL-DL configurations 1-6 and PUCCH format 3, $$\sum_{c=0}^{C-1} \left( (V_{DAI,c}^{DL} - U_{DAI,c}) \cdot n_c^{ACK} + \sum_{k \in K} N_{k,c}^{received} \right)$$

where c is the number of configured cells, $V_{DAI,c}^{DL}$ is the $V_{DAI}^{DL}$ in serving cell c, and $U_{DAI,c}$ is the $U_{DAI}$ serving cell c, and $n_c^{ACK}$ is the number of HARQ-ACK bits corresponding to the configured DL transmission mode on serving cell c. In case of spatial HARQ-ACK bundling or for PDCCH indicating downlink SPS release, $n_c^{ACK}=1$. In case of no spatial HARQ-ACK bundling $N_{k,c}^{received}$ is the number of transport blocks received and SPS release PDCCH received in subframe i-k on serving cell c, where k∈K. In case of spatial HARQ-ACK bundling, $N_{k,c}^{received}$ is the number of received PDCCH in subframe i-k and serving cell c, where k∈K.

Some Considerations of $n_{HARQ}$ for Format 3 in LTE-A TDD
  Considering the application of dual RM coding scheme for format 3 if there are more than 11 bits UCI to be transmitted on PUCCH, the definition of $n_{HARQ}$ would be different between single RM and dual RM scheme.
  Single RM coding scheme
    The parameter $n_{HARQ}$ is based on the number of received TB.
  Dual RM coding scheme
    In this case, two ACK/NACK groups should be defined. However, the number of ACK/NACK in each group may not be the same. Considering the transmit power for the group with lager number of ACK/NACK, the parameter $n_{HARQ}$ can be equal to $\max(RM_1, RM_2)*2$, where $RM_i$ refers to the number of received TB in the ith ACK/NACK group if spatial bundling is not used, or the number of ACK/NACK bits after spatial bundling in the ith ACK/NACK group if the spatial bundling is used.

For dual RM coding scheme, many segmentation methods were discussed in the previous meetings [6-7]. Generally, these segmentation methods try to divide the total number of ACK/NACK bits into two groups with the same number of ACK/NACK bits in each group. Thus, the current definition $n_{HARQ}=RM_1+RM_2$ may be used. However, there are still cases where the number of ACK/NACK bits in two ACK/NACK groups may not be equal, e.g. if UE is configured with transmission mode 9 on all serving cell, and only one TB with PDSCHs can be transmitted, thus the number of ACK/NACK bit in the first group will be much larger than the other group according to the ordering and segmentation of HARQ-ACK in [8]. Then the adoption of the definition $n_{HARQ}=\max(RM_1, RM_2)*2$ is more reasonable in the dual RM coding scheme. In addition, the dynamic power adjustment through parameter $n_{HARQ}$ is more accurate than the semi-static approach via parameter $\Delta_{F\_PUCCH}(F)$, as $n_{HARQ}$ will be changed according to the number of ACK/NACK bits, while $\Delta_{F\_PUCCH}(F)$ have to be signaled by higher layers.

In this contribution, we discuss the definition of parameter $n_{HARQ}$ in $h(n_{CQI}, n_{HARQ}, n_{SR})$ for PUCCH power control for LTE-A TDD. In particular, we propose the following:
For PUCCH format 1b with channel selection
  In the case of HARQ-ACK bundling is not applied
    $n_{HARQ}$ should be based on the number of received transport blocks and the number of received SPS release PDCCH in subframes i-$k_m$
  In the case of HARQ-ACK bundling is applied
    For M=2, $n_{HARQ}$ should be based on the number of received PDSCH and the number of received SPS release PDCCH in subframes i-$k_m$
    For M=3 or 4, $n_{HARQ}=2$ if UE receives PDSCH or PDCCH indicating downlink SPS release only on one serving cell in subframe(s) i-$k_m$; Otherwise, $n_{HARQ}=4$.
  For PUCCH format 3:
    For FDD with two configured serving cells and PUCCH format 1b with channel selection, or FDD with two or more configured serving cells and PUCCH format 3, or TDD with two configured serving cells and PUCCH format 1b with channel selection and subframes within which HARQ-ACK is transmitted without spatial bundling, or for TDD UL-DL configuration 0 and PUCCH format 3, if the UE receives an SPS release PDCCH in subframe n-m, $n_{HARQ}=$(number of transport blocks received in subframe n-m)+1; otherwise, $n_{HARQ}=$(number of transport blocks received in subframes n-m). For FDD, m=4; for TDD, m=k, where k∈K.
    For TDD UL-DL configurations 1-6 and PUCCH format, $$\sum_{c=0}^{C-1}\left((V_{DAI,c}^{DL}-U_{DAI,c})\cdot n_c^{ACK}+\sum_{k\in K}N_{k,c}^{received}\right)$$

where c is the number of configured cells, $V_{DAI,c}^{DL}$ is the $V_{DAI}^{DL}$ in serving cell c, and $U_{DAI,c}$ is the $U_{DAI}$ serving cell c, and $n_c^{ACK}$ is the number of HARQ-ACK bits corresponding to the configured DL transmission mode on serving cell c. In case of spatial HARQ-ACK bundling or for PDCCH indicating downlink SPS release, $n_c^{ACK}=1$. In case of no spatial HARQ-ACK bundling $N_{k,c}^{received}$ is the number of transport blocks received and SPS release PDCCH received in subframe i-k on serving cell c, where k∈K. In case of spatial HARQ-ACK bundling, $N_{k,c}^{received}$ is the number of received PDCCH in subframe i-k and serving cell c, where k∈K.

For TDD with two configured serving cells, PUCCH format 1b with channel selection and HARQ-ACK bundling, $$n_{HARQ}=\sum_{c=0}^{1}\min(N_{SPS}+V_{DAI,c}^{DL},2).$$

While aspects of this invention have been shown and described, it will be apparent to those skilled in the art that many more modifications are possible without departing from the inventive concepts that are described herein. The invention, therefore, is not to be restricted except in the spirit of the following claims.

The invention claimed is:

1. A method for power control of physical uplink control channel (PUCCH) format 1b for advanced time division duplex, the method comprising:
    identifying if HARQ-ACK bundling is applied;
    if HARQ-ACK bundling is not applied, determining $n_{HARQ}$ associated with the PUCCH based on a number of received transport blocks and SPS release physical downlink control channels in subframes i-$k_m$; and
    if HARQ-ACK bundling is applied and a number of assigned resource blocks equal to 2, determining $n_{HARQ}$ associated with the PUCCH based on a number of received physical downlink shared channels (PDSCH) and semipersistent scheduling (SPS) release physical downlink control channels (PDCCH) in the subframes i–$k_m$,
    where:
    i is the index of subframes;
    k is an element of set K:{$k_0, k_1, \ldots k_{M-1}$} given in Table 10.1-1 in 3GPP TS 36.213 v10.0.0, entitled Evolved Universal Terrestrial Radio Access (E-UTA) Physical layer procedures, Release 10; and
    $k_m$ is the smallest value in set K such that the user equipment detects a PDCCH in subframe i-$k_m$.

2. The method of claim 1, wherein if the number of assigned resource blocks=3 or 4, $n_{HARQ}=2$ if a user equipment using the PUCCH receives an indication downlink SPS release only on one serving cell in the subframes i-$k_m$.

3. A method for power control of physical uplink control channel (PUCCH) format 3 for advanced time division duplex configuration 0, the method comprising:
    determining if a user equipment receives a semi-persistent scheduling (SPS) release physical downlink control channel (PDCCH) in subframe n-m;
    if the user equipment receives the SPS release PDDCH PDCCH in subframe n-m; setting an $n_{HARQ}$ equal to a number of transport blocks received in subframe (n-m)+1; and
    if the user equipment fails to receive the SPS release PDCCH in subframe n-m; setting the $n_{HARQ}$ equal to the number of transport blocks received in subframe n-m;
    where:
    $n_{HARQ}$ is a number of hybrid auto repeat request (HARQ) bits in a subframe;
    n is an index value of the subframe;
    k is an element of set K:{$k_0, k_1, \ldots k_{M-1}$} given in Table 10.1-1 in 3GPP TS 36.213 v10.0.0, entitled Evolved Universal Terrestrial Radio Access (E-UTA) Physical layer procedures, Release 10; and $k_m$ is the smallest value in set K such that the user equipment detects a PDCCH in subframe n-$k_m$.

4. An article of manufacture including a computer-readable medium having instructions stored thereon for power control of physical uplink control channel (PUCCH) format 1b for advanced time division duplex, the instructions comprising:
   instructions for identifying if HARQ-ACK bundling is applied;
   if HARQ-ACK bundling is not applied, instructions for determining $n_{HARQ}$ associated with the PUCCH based on a number of received transport blocks and SPS release physical downlink control channels in subframes i-$k_m$;
   if HARQ-ACK bundling is applied and a number of assigned resource blocks equal to 2, determining $n_{HARQ}$ associated with the PUCCH based on a number of received physical downlink shared channels (PDSCH) and semipersistent scheduling (SPS) release physical downlink control channels (PDCCH) in the subframes i-$k_m$,
   where:
   i is the index of subframes:
   k is an element of set K:{$k_0, k_1, \ldots k_{M-1}$} given in Table 10.1-1 in 3GPP TS 36.213 v10.0.0, entitled Evolved Universal Terrestrial Radio Access (E-UTA) Physical layer procedures, Release 10; and
   $k_m$ is the smallest value in set K such that the user equipment detects a PDCCH in subframe i-$k_m$.

5. The article of manufacture of claim 4, wherein if the number of assigned resource blocks=3 or 4, $n_{HARQ}$=2 if a user equipment using the PUCCH receives an indication downlink SPS release only on one serving cell in the subframes i-$k_m$.

6. An article of manufacture including a computer-readable medium having instructions stored thereon for power control of physical uplink control channel (PUCCH) format 3 for advanced time division duplex, the instructions comprising:
   determining if a user equipment receives an semi-persistent scheduling (SPS) release physical downlink control channel (PDCCH) in subframe n-m;
   if the user equipment receives the SPS release PDCCH in subframe n-m; setting an $n_{HARQ}$ equal to a number of transport blocks received in subframe (n-m)+1; and
   if the user equipment fails to receive the SPS release PDCCH in subframe n-m; setting the $n_{HARQ}$ equal to the number of transport blocks received in subframe n-m;
   where:
   $n_{HARQ}$ is a number of hybrid auto repeat request (HARQ) bits in a subframe;
   n is an index value of the subframe;
   k is an element of set K:{$k_0, k_1, \ldots k_{M-1}$} given in Table 10.1-1 in 3GPP TS 36.213 v10.0.0, entitled Evolved Universal Terrestrial Radio Access (E-UTA) Physical layer procedures, Release 10; and
   $k_m$ is the smallest value in set K such that the user equipment detects a PDCCH in subframe n-$k_m$.

* * * * *